Nov. 3, 1959   R. J. DEWEY   2,911,253
AUTOMOBILE TRUNK LINER
Filed Jan. 30, 1957
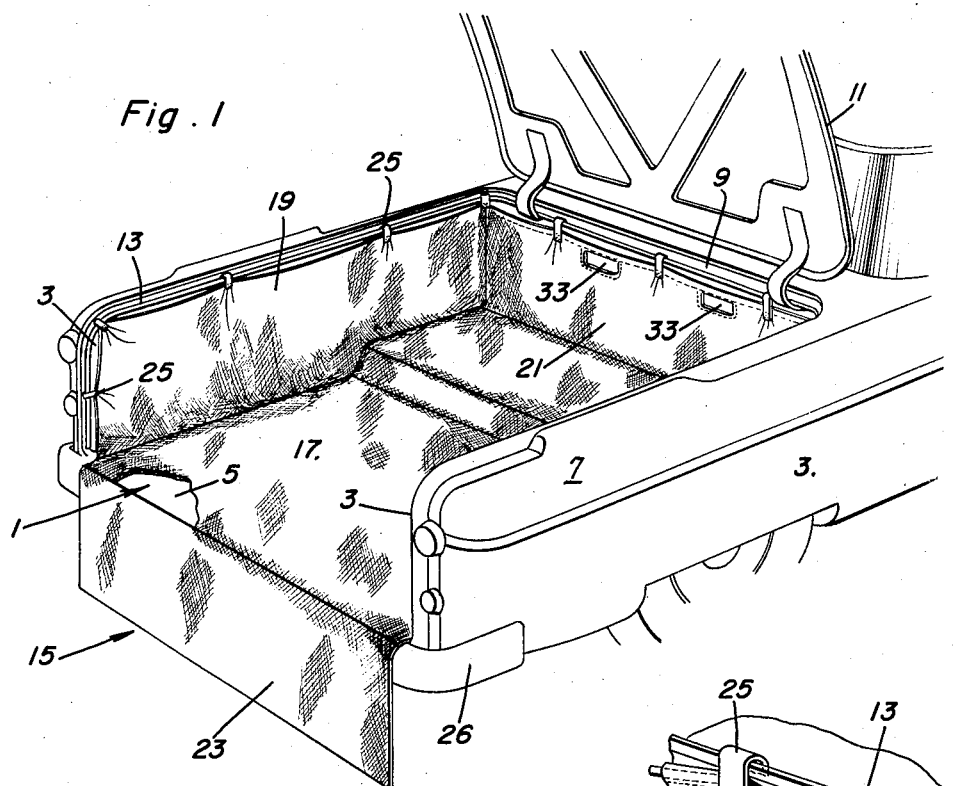
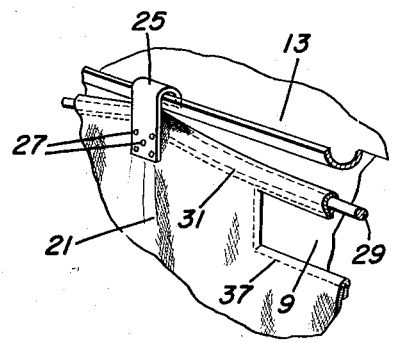
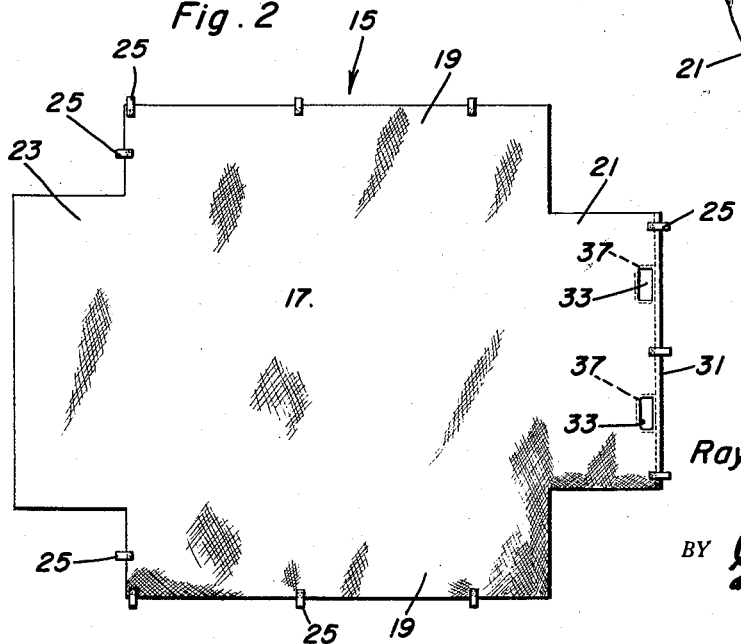
Raymond J. Dewey
INVENTOR.

United States Patent Office 2,911,253
Patented Nov. 3, 1959

2,911,253
AUTOMOBILE TRUNK LINER

Raymond J. Dewey, Phoenix, Ariz.

Application January 30, 1957, Serial No. 637,121

1 Claim. (Cl. 296—39)

My invention relates to improvements in liners for the trunks of automobiles.

The primary object of my invention is to provide an inexpensive, durable liner for covering the bottom, sides and front end of the trunk of an automobile to protect the trunk from becoming soiled or damaged in hauling such material as garbage, sand or gravel, and which is adapted for use to facilitate unloading of such material from the trunk, is foldable compactly when not in use for storage, and is easy to clean.

Another object is to provide a liner for the above purpose which is adapted to protect the rear bumper in unloading such material from the trunk and is easily and quickly attachable to the conventional edge gutters, or troughs, in which the trunk lid seats.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary view in perspective of my improved liner attached to the edge gutters of an automobile trunk of commerce;

Figure 2 is an enlarged view of the liner detached and spread out in flat condition; and Figure 3 is a fragmentary, enlarged view in perspective illustrating on a larger scale the front flap of the liner.

Referring to the drawing by numerals, my improved liner has been shown therein, for illustration purposes, as attached to a box-type trunk 1 of an automobile 3, the trunk having a bottom 5, vertical sides 7, a front end 9, and a lid 11. A gutter or trough 13 extends along the top edges of the sides 7 and front end 9 for seating the lid 11 when closed, all as is conventional.

My improved liner, designated generally by the numeral 15, comprises a sheet 17 of flexible waterproof material, such as plastic, canvas or the like, and which is cruciform in shape when spread out flat, as shown in Figure 2, whereby said sheet is provided with side flaps 19 and front and rear flaps 21, 23, all of rectangular form.

The flaps 21, 19, 23 are swingable upwardly on the sheet so that the liner is formed generally into box shape and fits in the trunk 1 with the front flap 21 fitting against the front end 9, the side flaps 19 fitting against the sides 9, as shown in Figure 1, and the rear flap 23 adapted to be swung on the sheet over a load, not shown, in the trunk or swung to hang pendant out of the trunk and over the rear bumper 26 of the automobile 3, as shown in Figure 1.

Clamping hooks 25, preferably of flat resilient metal, are riveted, as at 27, to free edges of the flaps 21, 19 to fit clampingly in the gutter 13 and attach the liner 15 in the trunk 1.

The front flap 21 is reinforced along its free longitudinal outer edge by a suitable flexible reinforcing strip 29 in a hem 31 extending along said outer edge coextensive therewith, and said flap is provided adjacent its ends and said outer edge with a pair of rectangular openings 33 one side of which is formed by the hem 31 and around the other sides of which the flap 21 is provided with reinforcing hems 37, all for a purpose presently clear. The hooks 25 alternate with the openings 33 to clear the same.

The manner in which the liner 15 is used will be readily understood. When it is attached, in the manner already described, the rear flap 23 is swung in between the side flaps 19 over a load so that the lid 11 may be closed.

A light load, or a portion of a load, may be discharged, when the lid 11 is opened, by freeing the hooks 25 from the gutter 13, swinging the rear flap 23 downwardly on the sheet over the bumper 26 to protect the same, and then inserting the hands through the openings 33, grasping the reinforced hem 31 at said openings and pulling the liner 15 rearwardly over the bumper and out of the trunk. When detached, the liner 15 may be rolled or folded compactly for storage or transportation when not in use.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A liner for an automobile trunk comprising a sheet of flexible material of cruciform shape including a front, a rear, and side flaps, respectively, of rectangular shape and like width and swingable on the sheet to form the sheet into box shape to fit in an automobile trunk, the front flap having a free longitudinal edge provided with a hem coextensive therewith, and a flexible reinforcing strip in said hem, said front flap having openings therein adjacent its ends and said free edge formed on one side by said hem and through which a person's hands may be inserted to grasp the hem for pulling of the liner out of a trunk, and resilient hooks on said front and side flaps fitting clampingly in gutters on top edges of an automobile trunk and alternating on said front flap with said openings.

References Cited in the file of this patent
UNITED STATES PATENTS

| Number | Name | Date |
|---|---|---|
| 423,380 | Fry | Mar. 11, 1890 |
| 1,059,058 | McDonald | Apr. 15, 1913 |
| 1,904,905 | Titcomb | Apr. 18, 1933 |
| 2,060,362 | Zurcher | Nov. 10, 1936 |
| 2,234,180 | Lackey et al. | Mar. 11, 1941 |
| 2,803,491 | Brown | Aug. 20, 1957 |